Patented May 1, 1928.

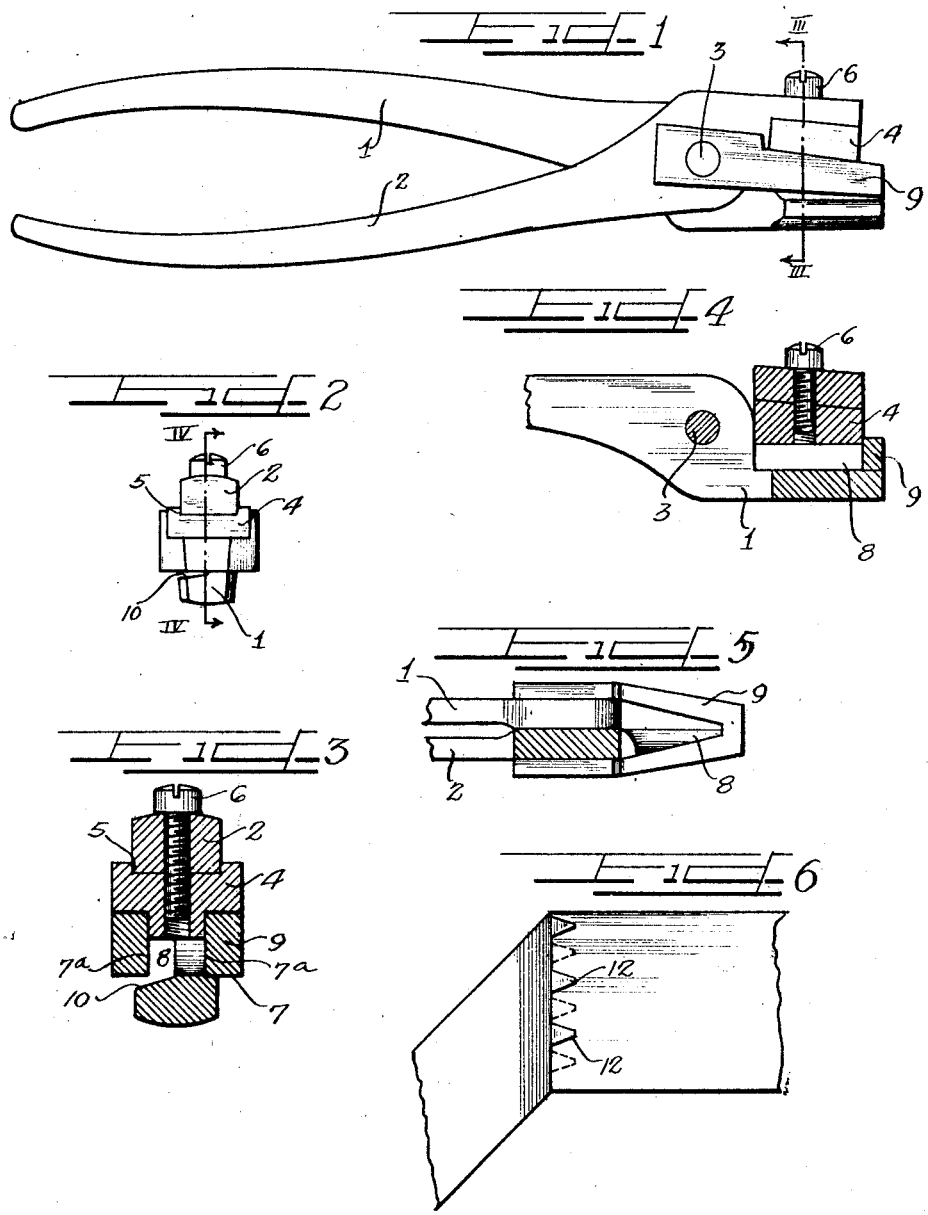

1,667,985

UNITED STATES PATENT OFFICE.

LEMUEL H. PURNELL, OF CHICAGO, ILLINOIS.

NOTCHING TOOL.

Application filed June 13, 1925. Serial No. 36,844.

This invention relates to a notching tool for cutting notches or the like in the margin of sheet metal.

It is an object of this invention to provide a simple form of shears of novel design that will effectively sever suitable blanks from the margin of a sheet metal structure, leaving well defined notches.

The invention comprises the novel structure and combinations hereinafter described and more particularly pointed out and defined in the appended claims.

In the accompanying drawings which illustrate a preferred embodiment of this invention and in which similar reference numerals refer to similar features in the different views.

Figure 1 is an elevational view of the shears.

Figure 2 is a front elevational view of the shears.

Figure 3 is an enlarged sectional view upon the line III—III of Figure 1.

Figure 4 is an enlarged sectional view upon the line IV—IV of Figure 2.

Figure 5 is a view through the jaws of the shears showing part in elevation and part in section.

Figure 6 is a perspective view of a pair of sheet metal members joined together through engaging tongues formed by this invention.

As shown on the drawings:

Referring to the drawing there is shown a tool consisting of a pair of crossed levers 1 and 2 which are pivoted together intermediate their ends by a pivot 3. The pivot 3 is located a short distance from the forward ends of the levers whereby a pair of jaw members are provided that are somewhat similar to those of a pair of pinchers. The jaw member on the lever 2 has a die or male shearing element 4 attached thereto. This shearing element is wider than the jaw portion of the lever and is recessed as indicated at 5 to receive the jaw member. This connection holds the male shearing element in rigid relation with the lever 2 and prevents lateral thrust. A screw or bolt 6 may be used to removably secure the shearing element in position. The lower surface of the shearing element 4 has a triangular or wedge shaped depending portion 7 that fits into a similarly shaped recess 8 in the forward part of a bifurcated female shearing element 9 which is positioned upon the jaw portion of the lever 1. The ends of the bifurcated female shearing element are rigidly secured upon the projecting ends of the pivot 3.

One side of the jaw portion of the lever 1 is bevelled or cut away as indicated at 10 to provide an exit for the escape of sheared blanks from the female shearing element and the side walls of the depending portion 7 are tapered somewhat as indicated at 7ª to permit the sheared blanks to fall freely after having been severed.

It will be noted that the front end of the recess 8 is closed and the cutting projection 7 of the male shearing element 4 extends to the front end of the lever 2 which terminates at the front end of the recess 8. Consequently when the shears are operated a V shaped blank may be completely severed from the margin of a sheet of metal without in any way injuring the sheet.

This shearing tool is especially applicable in notching the margin of a sheet metal member 11 to provide tongues 12 for attaching another sheet metal member 13 thereto as shown in Figure 6. Usually alternate tongues are slightly bent in opposite directions for overlapping opposite sides of the joined member 13. This tool is especially adapted for notching irregular sheets which must be used in making cornices and other sheet metal devices and experience has demonstrated that the use of the tool in such work results in the saving of a large amount of time and effort which would otherwise have to be expended under the old practice.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a notching tool, a pair of crossed members pivoted together to provide jaws of unequal length, a bifurcated member having a V shaped recess positioned upon the longer jaw and a male shearing element having a portion fitting said recess secured upon the shorter jaw member, said longer jaw being bevelled upon one side to provide an exit for the blank sheared in said V shaped recess.

2. In a notching tool, a pair of crossed levers, a pivot connecting said levers to provide a pair of coacting jaws, a member attached to said pivot and supported upon one jaw, said member having a recess, and the other jaw having a shearing element adapted for entering said recess.

3. In a notching tool, a pair of crossed levers pivoted together intermediate their ends to provide a pair of co-acting jaw members, a female shearing member having a substantially V-shaped recess removably supported upon one jaw member, and a male shearing element upon the other jaw member adapted for entering said recess, there being an exit from said recess for the escape of sheared blanks.

In testimony whereof I have hereunto subscribed my name.

LEMUEL H. PURNELL.